(12) United States Patent
Cromer et al.

(10) Patent No.: US 7,813,733 B2
(45) Date of Patent: Oct. 12, 2010

(54) FORCED ROAMING TO AVOID INTERFERENCE

(75) Inventors: Daryl C. Cromer, Cary, NC (US); Philip J. Jakes, Durham, NC (US); Howard J. Locker, Cary, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 1106 days.

(21) Appl. No.: 10/899,780

(22) Filed: Jul. 27, 2004

(65) Prior Publication Data
US 2006/0025127 A1    Feb. 2, 2006

(51) Int. Cl.
*H04M 36/00* (2006.01)

(52) U.S. Cl. ............ 455/436; 455/442; 455/452.2; 455/432.1; 455/435.1; 370/331; 370/332; 370/333

(58) Field of Classification Search ............ 455/432.1, 455/422.1, 432.2, 435.1, 436, 439, 445, 442, 455/452.2; 370/331, 332, 333
See application file for complete search history.

(56) References Cited

U.S. PATENT DOCUMENTS

| | | | |
|---|---|---|---|
| 5,455,967 A * | 10/1995 | Amezawa et al. | 455/69 |
| 5,828,661 A | 10/1998 | Weaver, Jr. et al. | 370/331 |
| 5,903,840 A | 5/1999 | Bertacchi | 455/435 |
| 6,070,075 A | 5/2000 | Kim | 455/437 |
| 6,104,926 A | 8/2000 | Hogg et al. | 455/431 |
| 6,119,005 A | 9/2000 | Smolik | 455/437 |
| 6,215,811 B1 | 4/2001 | Yuen | 375/143 |
| 6,215,982 B1 * | 4/2001 | Trompower | 455/63.3 |
| 6,240,291 B1 | 5/2001 | Narasimhan et al. | 455/436 |
| 6,324,207 B1 | 11/2001 | Kanterakis et al. | 375/141 |
| 6,332,077 B1 | 12/2001 | Wu et al. | 455/432 |
| 6,606,496 B1 * | 8/2003 | Salvarani et al. | 455/436 |
| 6,799,045 B1 * | 9/2004 | Brouwer | 455/453 |
| 6,985,739 B2 * | 1/2006 | Spaling et al. | 455/453 |
| 2004/0223470 A1 * | 11/2004 | Smith | 370/332 |
| 2005/0059399 A1 * | 3/2005 | Raval et al. | 455/436 |
| 2005/0113129 A1 * | 5/2005 | Robinson | 455/524 |
| 2005/0130658 A1 * | 6/2005 | Stephens | 455/436 |
| 2005/0208950 A1 * | 9/2005 | Hasse | 455/453 |
| 2006/0052104 A1 * | 3/2006 | Kono | 455/436 |

* cited by examiner

*Primary Examiner*—Ajit Patel
*Assistant Examiner*—Khai M Nguyen
(74) *Attorney, Agent, or Firm*—James A. Lucas; Driggs, Hogg, Daugherty & Del Zoppo Co., LPA (57) ABSTRACT

In a wireless network in which a client has access to multiple Access Points the client usually attaches to one of the Access Points (AP) and stays attached even though signal transmission is impaired, whereas transmission would not be impaired if the client attaches to another one of the multiple APs. Apparatus and method are described to detect interference noise level and force the client to roam and attach to another AP if interference noise level impairs signal transmission.

17 Claims, 7 Drawing Sheets

| | Avg Signal Strength (1-10) | Min Signal Strength (1-10) | Max Signal Strength (1-10) | Roam Flag |
|---|---|---|---|---|
| (IP Address or Name) | 404 | 406 | 408 | Y/N |
| Name 1 | | | | |
| Name 2 | | | | |
| Name 3 | | | | |
| n | | | | |

402

400 Interference Table in Access Point

FORCED ROAMING TO AVOID INTERFERENCE

BACKGROUND OF THE INVENTION

1. Technical Field

The present invention relates generally to wireless communication devices and in particular to wireless communication devices utilized in computer systems. Still more particularly, the present invention is directed to optimizing performance by avoidance of interference.

2. Description of the Related Art

The need for personal wireless communications is expanding rapidly with the advances in digital communications and personal communications systems. The progress in wireless radio technology and the growth rate of the wireless telephone systems over the last several years is indicative of tremendous market demand for location independent communication via wireless access. Many of the current wireless networks architectures are primarily designed and optimized for voice communications and wide area coverage. With the proliferation of personal and portable computers, and local area networks, it is envisioned that data services and applications such as file server access, client-server execution, and electronic mail will require wireless access to the LAN environment supporting distributed computing. The use of wireless communication systems to transmit data traffic utilizing mobile devices which communicate with a hardwired network, such as a LAN has become widespread. In the future mobile workers could be connected everywhere on campus with increased productivity. Retail stores and warehouses, for example, may use wireless communications systems with mobile data terminals to track inventory and replenish stock. The transportation industry may use such systems at large outdoor storage facilities to keep an accurate account of incoming and outgoing shipments. In manufacturing facilities, such systems are useful for tracking parts, completed products and defects. Since reliability of data traffic will become essential, the wireless access protocol must efficiently accommodate the very dynamic nature of interference.

A typical wireless communications system includes a number of fixed access points (also known as base stations) interconnected by a cable medium often referred to as a system backbone. Associated with each access point is a geographic cell. The cell is a geographic area in which an access point has sufficient signal strength to transmit data and receive data from a mobile device such as a data terminal or telephone with an acceptable error rate. Typically, access points will be positioned along the backbones such that the combined cell area coverage from each access point provides full coverage of a building or site. In the case of WLAN (Wireless LAN), frequently there are significant overlaps in cells to increase data capacity. So a user typically has access to several different access points in any given location. The reason for this is that the capacity of the network is a function of the number of access points. For 802.11 b network, an access point provides 11 Mbps, which is shared by number of users.

Mobile computers with WLAN are designed to be carried throughout the system from cell to cell. Each mobile device is capable of communicating with the system backbone via wireless communication between the mobile device and an access point to which the mobile device is registered. As the mobile device roams from one cell to another, the mobile device will typically deregister with the access point of the previous cell and register with the access point associated with the new cell.

Recently, a standard for wireless local area networks (WLANs) known as the IEEE 802.11 standard has been adopted and has gained wide spread acceptance in the industry among computer users. The IEEE 802.11 standard for WLANs is a standard for systems that operate in the 2,400-2,483.5 MHz industrial, scientific and medical (ISM) band. The ISM band is available worldwide and allows unlicensed operation of spread spectrum systems. The IEEE 802.11 RF transmissions use multiple signaling schemes (modulations) at different data rates to deliver a single data packet between wireless systems. The latest IEEE 802.11 wireless LAN uses a band of frequencies near 2.4 Ghz for direct sequence spread spectrum transmissions.

The RF spectrum is a limited bandwidth spectrum that is allocated among a number of different services types/applications, including military, aviation, broadcast, and commercial communications. Because of the very limited bandwidth available within the radio frequency (RF) spectrum, transmission in this medium is subject to strict government regulations. The regulations typically cover the type and parameters of the transmitters being utilized in a wireless network. These regulations cover modulation scheme, frequency of operation, and transmit power of the transmitters in order to avoid interference among the various authorized services utilizing the RF spectrum.

Another recently adopted short-range standard has evolved known as the Bluetooth standard. The Bluetooth standard is a low-cost short range wireless connection which uses much of the same range of frequencies for its frequency-hopping spread spectrum transmissions as the IEEE 802.11 standard. Bluetooth is considered a personal area network (PAN) since it is limited to short range distance 30 ft and was designed as a cable replacement technology. Bluetooth replaces the cables that previously connected Personal Computers or other client devices to peripherals such as printers, headphones, and PDAs.

The ISM band (2.4 Ghz band) allows for a shared transmission medium between the various technologies 802.11 b, Bluetooth, and other devices such as cordless phones and microwave ovens. A client device has the ability to associate with various access points, but will select based on priority order or first response. Current methods to select which access point to associate with do not consider the adverse effect of noise from other devices in 2.4 Ghz band. Therefore, a client may select an access point such that the transmission path to the client is subject to interference from other devices instead of a clear path, with no interference, to another access point. Accordingly, there is a strong need in the art for a system and method that allows a client, on the wireless LAN, to associate with access points to minimize interference.

SUMMARY OF THE INVENTION

In accordance with an embodiment, a method and system of optimizing performance of client system by dynamically determining the best access point for association to avoid interference in a wireless local area network is provided. The wireless local area network includes a plurality of access points that the client can association with to gain access to the network over a wireless medium. The access point dynamically monitors the level of interference between the connection to plurality of clients and a list is dynamically maintained identifying clients currently associated to the access point that are currently in range and the interference noise level, wherein if the level of interference noise exceeds a threshold level the access point instructs the client roams to another access point.

In an alternative embodiment, a method of minimization of impact of interference in a wireless local area network is provided by monitoring the level of interference on the connection between the client to the access node; when the level of noise exceeds a threshold value the access point then starts compiling a list of clients that are within range. The access points report the status of clients and signal quality to a centralized sever/database which based on the entire network (utilization, capacity, noise levels) determine which clients to reassign to minimize the interference. Based on response from server, the access points request certain clients to roam to another access point.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
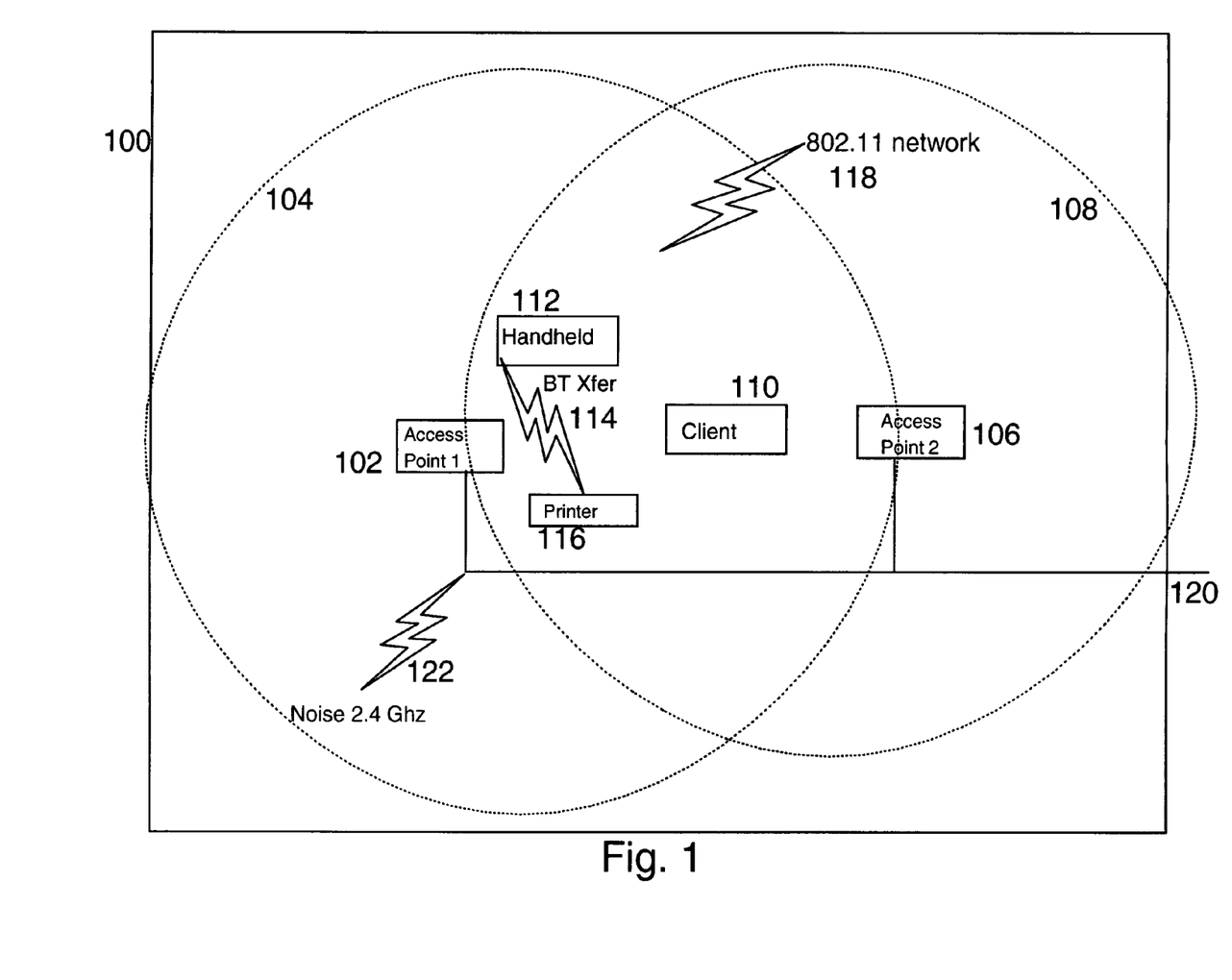
FIG. 1 depicts a Wireless Local Area Network (WLAN) comprising a plurality of access points, devices, and peripherals in accordance with an embodiment of the present invention.

With reference now to the figures, and in particular with reference to FIG. 1, there is shown a typically network configuration 100. Wired network 120 (such as Ethernet, Gigabit Ethernet, etc) is connected to plurality of access points 102 and 106. Range of Access Points 102 and 106 are indicated by dashed lines 104 and 108, respectively. The wireless network 118 is created from the combination of wireless network of access points 102 and 106, which are assigned to different channels or frequency ranges within ISM (2.4 GHz) band. A client device 110 can connect via wireless network 118 to access point 102 or access point 106, since it is within range 104 and 108, respectively. Furthermore, 802.11 protocol allows for seamless roaming between access points, which would allow client 110 to roam from access point 102 to access point 106, without loss of connection.

FIG. 1 also shows handheld device 112 communicating to printer 116 via another wireless protocol (Bluetooth) network 114. Furthermore, noise 122 in 2.4 GHz band can be generated from other sources such as microwaves, cordless phones, etc. The additional noise or communications in the ISM (2.4 GHz) band 122 and 114 will adversely impact the quality of communications between client 110 and access point 102. However, communication between client 110 and access point 106 would not be impacted, since noise 114 and 122 are short range in nature and do not reach the path between client 110 and access point 106. Thus, it would be prudent for client 110 to use access point 106 rather than 102.

Figure 2:
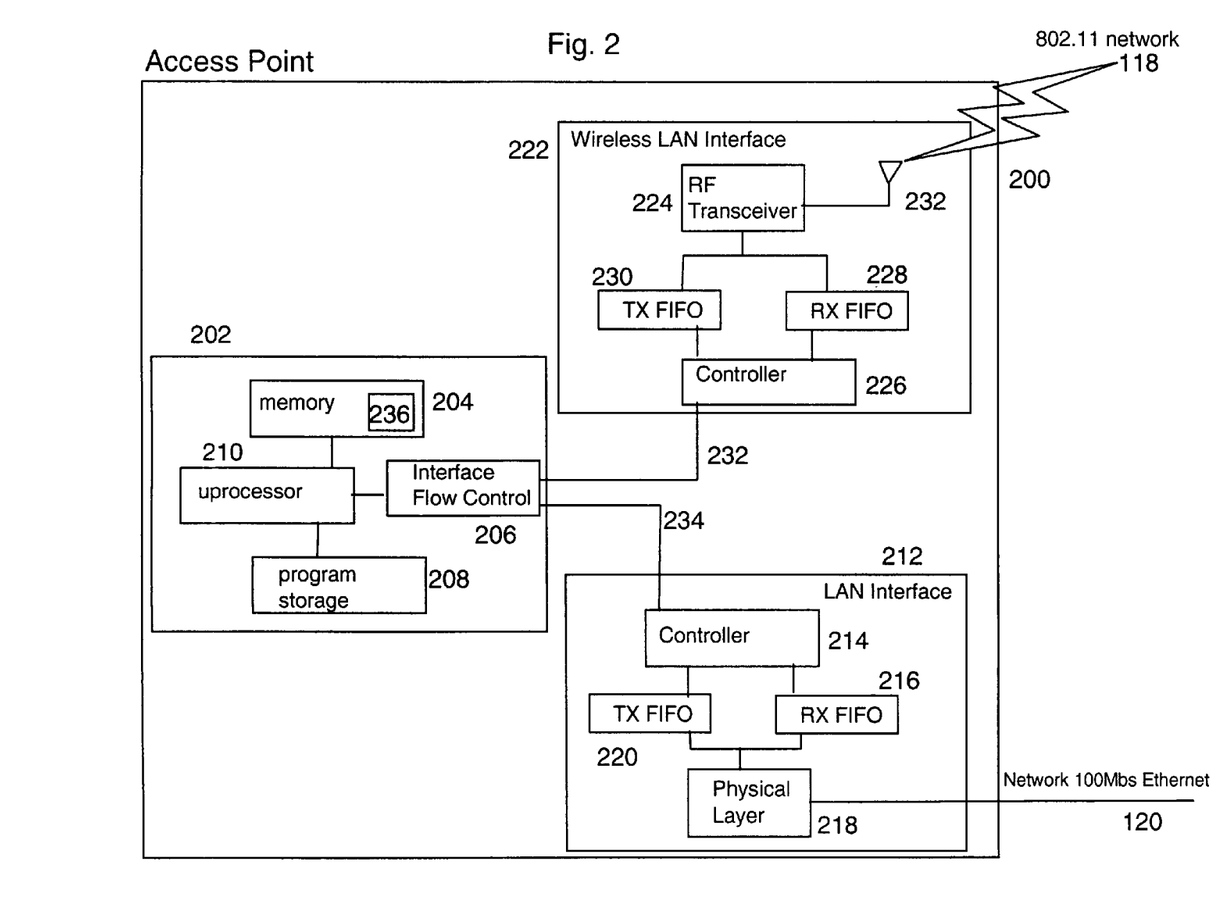
FIG. 2 depicts an access point of FIG. 1 in accordance with an embodiment of the present invention.

FIG. 2 illustrates the major functional blocks of access points 102 and 106. Access point 200, includes three major components: Master Controller 202, Wireless LAN Interface 222, and Wired LAN Interface 212. Master Controller 202 provides overall management for the Access Point whereas Wireless LAN Interface 222 controls access to and from the wireless network and Wired LAN Interface 212 provides access to and from the wired LAN. Master controller 202 is connected to wireless interface 222 and wired interface 212 by connection buses 232 and 234 respectively. Wireless LAN interface 222 which creates wireless network 118, includes microcontroller 226 which is connected to TX FIFO 230 and RX FIFO 228. The FIFOs are connected to RF transceiver 224 which is connected to antenna 232, which generates signals that make up network 118. Controller 226 is also connected to Interface Flow control 206 in Master controller 202. Interface Flow control 206 controls transfer of data between wireless interface 222 and wired interface 212. Master controller 202 comprises microprocessor 210, which pulls executable code from program store 208 and uses memory 204 to hold data during transfers. Memory 204 also contains table 236, which comprises a part of an interference noise detection mechanism and will be described in more detail later. Suffice it to say table 236 contains information used to determine interference levels between clients associated with the Access Point.

Access point 200 also contains LAN interface 212, which is connected to the backbone network 120 and includes physical layer 218, which is connected to TX FIFO, and RX FIFO 220 and 216 respectively. The FIFOs are connected to the controller or Media Access Controller 214, which connects to controller 202 via Interface Flow Control 206 by bus 234.

In a preferred embodiment, the wireless network operates in compliance with the IEEE 802.11 Standard and 802.11 b sub-standard, which provides a wireless connectivity system with access to one or more frequency bands for local area communications. The system may conform to the IEEE standard 802.11 "Direct Sequence Spread Spectrum Physical Layer Specification". Alternatively, the system may be employed utilizing the IEEE standard 802.11 "Frequency Hopping Spread Spectrum Physical Layer Specification" or any other protocol transmitting portions of packets at varying modulations and data rates. The standard defines three physical methods as well as two types of networking. The three different physical layer methods include two using radio frequency and one using infrared. The two radio physical layers operate in 2.4 GHz frequency range, one using frequency hopping spread spectrum (FHSS) and the other using direct sequence spread spectrum (DSSS). The one infrared physical layer operates using baseband infrared. Over the air data rates of 1 Mbps, 2 Mbps, 5.5 Mbps, and 11 Mbps are defined in the standard. The IEEE 802.11 standard defines two types of networking, one being ad hoc networking and the other being infrastructure. An ad hoc network is a network composed solely of stations within mutual communication range of each other via the wireless medium. With ad hoc networking, the wireless clients communicate to each other without the need for a wired network or access points. An infrastructure contains one or more access points which provide wireless clients with access to the wired network. The preferred embodiment deals with physical using radio frequency spectrum and infrastructure network configuration.

The 802.11 standard is limited in scope to the physical (PHY) and medium-access-control (MAC) network layers. The PHY layer corresponds directly to the lowest layer defined by the International Standards Organization in its 7-layer Open System Interconnect (OSI) network model. The MAC layer corresponds to the lower half of the second layer of that same model with Logical Link Control (LLC) functions making up the upper half of OSI layer 2. The standard actually specifies a choice of three different PHY layers, any of which can underlie a single MAC layer. Specifically, the standard provides for an optical-based PHY that uses infrared light to transmit data, and two RF-based PHYs that leverage different types of spread-spectrum radio communications. The RF-based PHYs, meanwhile, can be used to cover significant areas and indeed entire campuses when deployed in cellular-like configurations.

Figure 3:
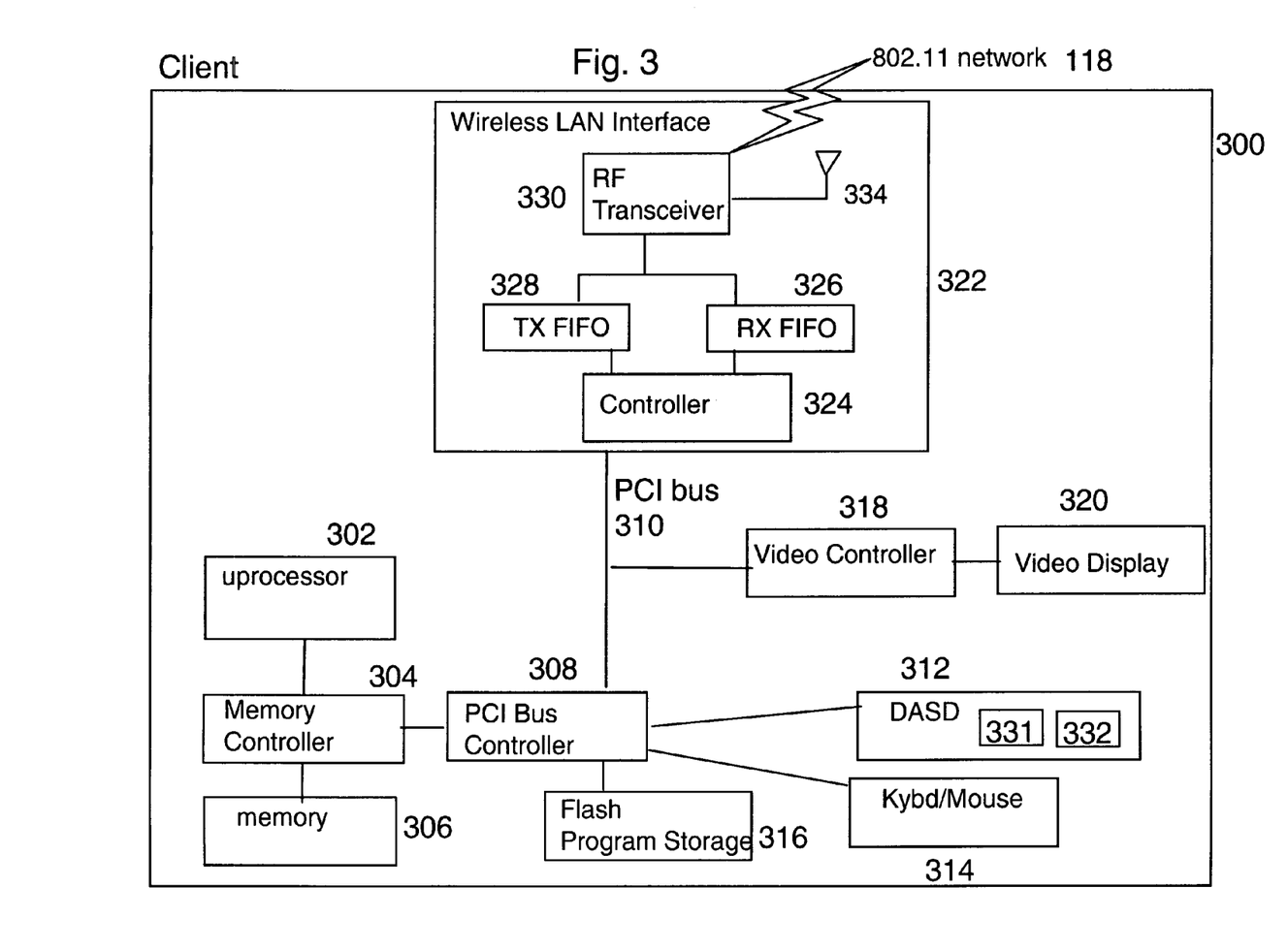
FIG. 3 depicts the client device of FIG. 1, in accordance with an embodiment of the present invention.

FIG. 3 illustrates an exemplary showing of a client such as laptop computer system configured for wireless communication. Computer 300 comprises, but is not limited to, a processing unit 302, which is connected by local bus to memory controller core chip 304. Core chip 304 is also connected to system memory 306, and a PCI bus controller 308. The system bus 310 may be any of several types of bus structures including a memory bus, a peripheral bus, and a local bus using any of a variety of bus architectures, but is illustrated as PCI bus. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus. PCI Bus Controller 308 is connected to Flash Program Storage 316, DASD 312 and Kybd/Mouse 314.

The system flash program storage 316 is nonvolatile memory such as read only memory (ROM) which contains basic input/output system (BIOS), containing the basic routines that help to transfer information between elements within computer 300, such as during boot-up. RAM 306 typically contains data and/or program modules that are immediately accessible to and/or presently being operated on by processing unit 302. By way of example, and not limitation, the program modules include operating system (OS), application programs, other program modules, and program data.

The DASD 312 in computer 300 may also include other removable/non-removable, volatile/nonvolatile computer storage media. By way of example only, illustrates a hard disk drive 331 and an optical disk drive 332 that reads from or writes to a removable, nonvolatile optical disk such as a CD ROM or other optical media.

A user may enter commands and information into the computer 300 through input devices such as a keyboard 314 and an integrated pointing device (e.g., a track point or track pad), commonly referred to as a touch pad. These and other input devices are integrated into chassis and are often connected to the processing unit 302 through controllers 304 and 308. A LCD panel 320 (integrated into lid) is also connected to the system bus 310 via an interface, such as a video interface 318

The computer 300 may operate in a networked environment using logical connections to one or more remote computers. The remote computer may be another personal computer, a server, a router, a network PC, a peer device or other common network node, and typically includes many or all of the elements described above relative to the computer 300. When used in a WLAN networking environment, the computer 300 is connected to the WLAN 118 through a WLAN network interface or wireless adapter 322. WLAN adapter 322 connects to system bus 310. Computer 300 may also be connected via wired LAN and/or the Internet via other connection modules such as a modem (not shown).

Wireless LAN adapter 322, which connects to wireless network 118, includes microcontroller 324 which is connected to TX FIFO 328 and RX FIFO 326. The FIFOs are connected to RF transceiver 330, which is connected to antenna 334, which generates signals that make up network 118. Controller 324 is also connected to PCI bus 310.

Figure 4:
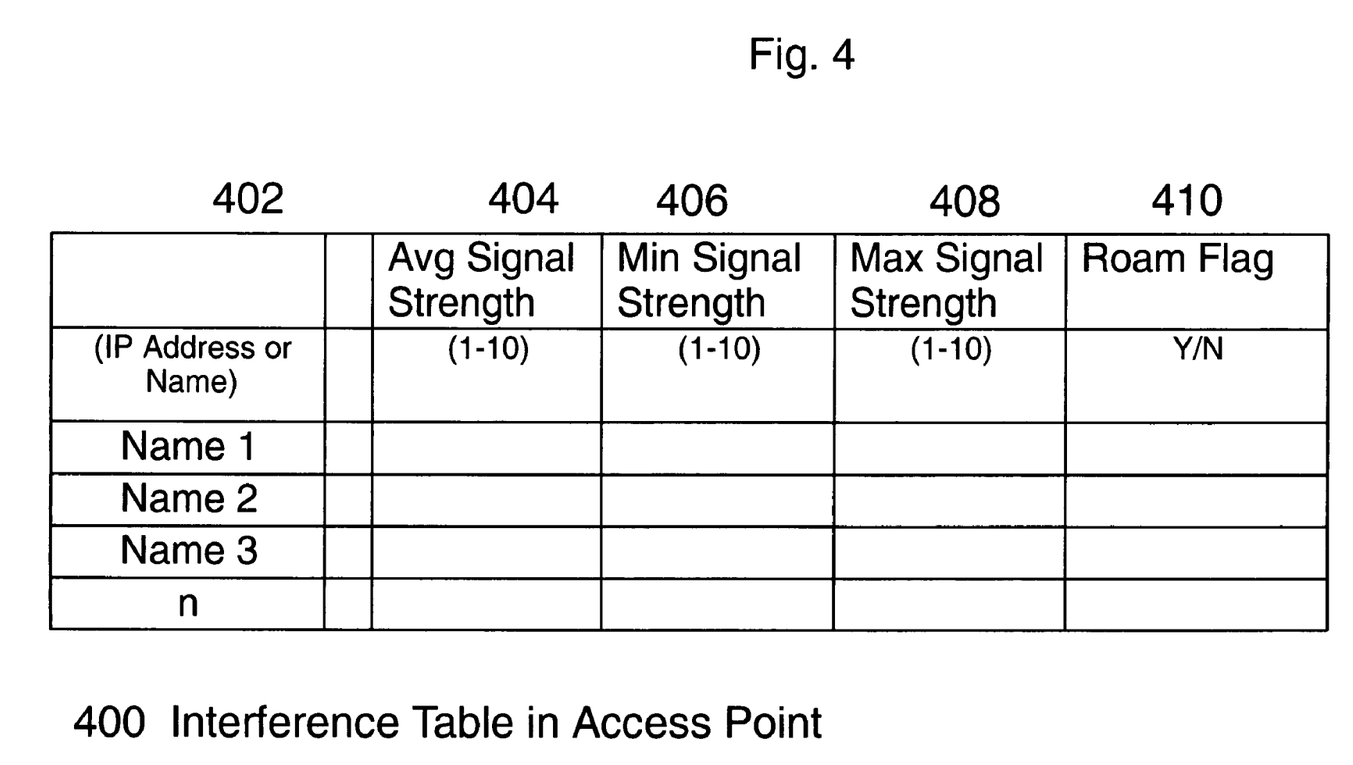
FIG. 4 illustrates a table in the Access Point that contains pertinent information concerning available access points in accordance with an embodiment of the present invention.

FIG. 4 illustrates details of interference table 236 which is stored in memory 204 of access point 200 (FIG. 2). Table 236 is dynamically updated by a program running in access point 200. Table 236 contains information for each client 402 associated with the access point. Each client is identified by name or IP address 402. For each client, the following information is maintained to gauge the quality of the connection. For each client 402, the average signal strength 404, the minimum signal strength 406, and maximum signal strengths 408 are dynamically updated. Based on values spread of average signal strength 404 and min/max signal strength 406/408, a determination of the interference reducing quality of connection is made resulting in roam flag 410 being set for that client. The access points algorithm for determination if average signal quality is a weighted time average that has a dynamic feedback to allow optimization of the time interval. Very small time intervals results in large number of forced roams whereas large time intervals would result in not reacting to noise events. Numerals 1-10 represent the range of values for the signal strength with 1 (lowest) and 10 (highest). The ranges of values are only examples and should not be construed as limiting the scope of the invention.

Figure 5:
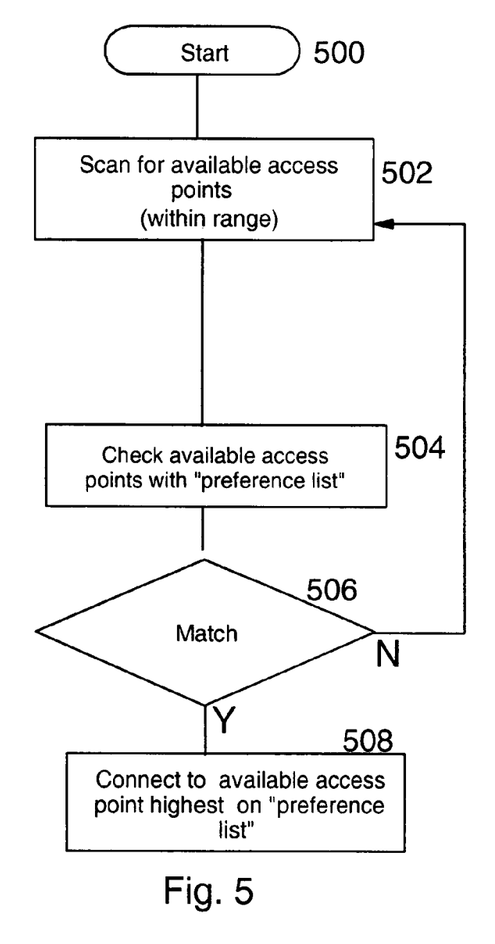
FIG. 5 shows a flow diagram of a method for client associating with an access points, in accordance with an embodiment of the present invention.

FIG. 5 is a flow chart used by the client device during association to access points. Starting at 500, the client enters 502 whereat it scans actively or passively for access points within range. After locating available access points, the client 110 (FIG. 1) enters 504 whereat it checks if the available access point is on the preference list of allowable access points. The preference list is kept in a table (not shown) in the client. The client, at 506, then checks for match between access points within range against preference list. If no match is identified, then the client restarts the scan in 502. If there is a match, the client then associates with the available access point highest on the preference list 508.

Figure 6:
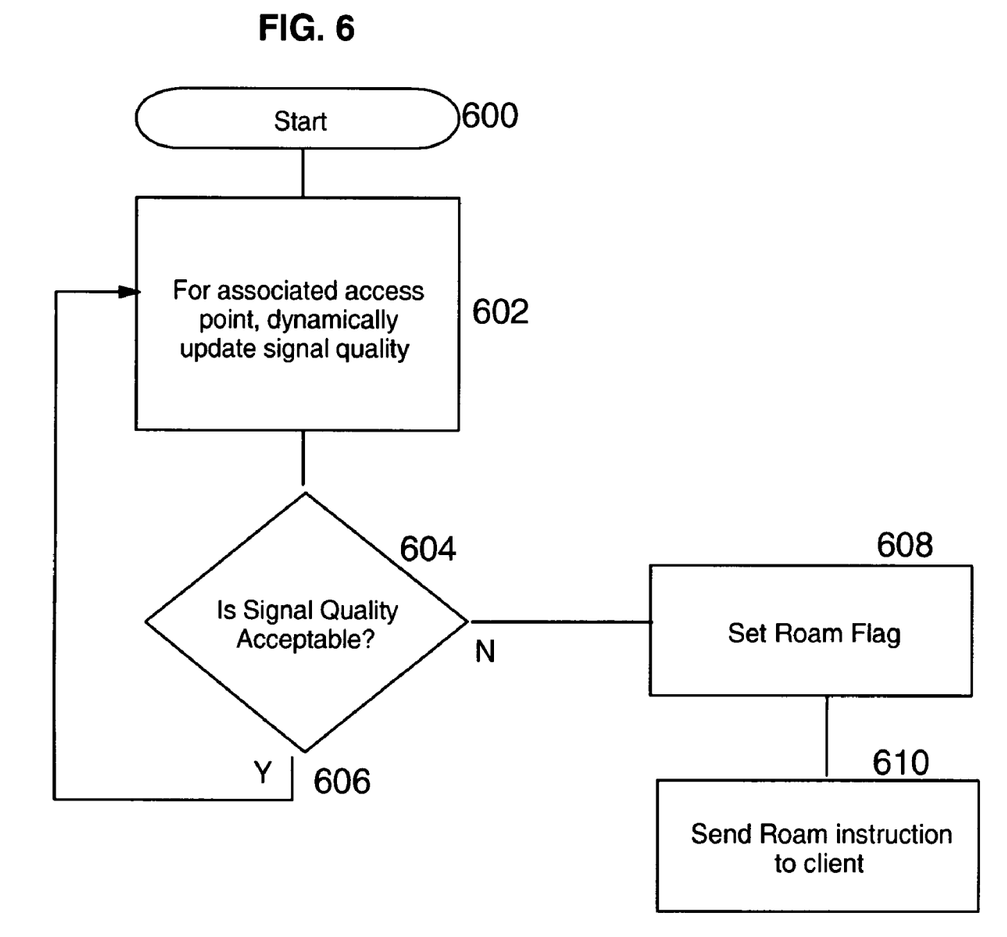
FIG. 6 shows a flow diagram of a method of the client device constantly checking signal quality of link in accordance with an embodiment of the present invention.

FIG. 6 is executed by the access point 200 and is used to update table 236 in access point memory 204. The flow starts at 600 and descends into 602 whereat for each associated access point, the table 236 is updated with signal quality parameters. In particular the average signal strength is calculated and stored in column 404 (FIG. 4). The average signal strength is based on settable time interval which is parameter set by system administrator and typically in minutes. The minimum signal strength is the lowest signal strength reported by the access point in the time interval is stored in column 406 and the maximum signal strength is stored in 408. The next step, in 604, is determination if the signal quality is acceptable. This is handled through an algorithm which can be adjusted based on the application. In the preferred embodiment, the algorithm checks for spread between the long term (several minutes) average signal strength 404 and the minimum and maximum values 406/408 reported. If there is significant spread, indicating that interference is present the roam flag 410 is set for that client at step 608.

In table 236, the normalized values for the signal strength are stored with 10 being the highest and 1 being the lowest. If the AP for a client has a min/max values in one case of 4 and 6 and another case of 3 and 5 respectively, that would be a spread of 2 deltas between min and max. If for another client it recorded values of 3 and 8, being a spread of 5 would indicate a large spread and likely impacted by interference. At step 610, if the roam flag 410 is set, then a request to the client to attempt to re-associate is sent. This flow is repeated for all clients 1-n associated with access point 200.

Another embodiment could be based on the average of the minimum and maximum signal strengths 408 signal strength 404 or minimum signal strength 406 dropping below a certain threshold.

In table 236, the normalized values for the signal strength are stored with 10 being the highest and 1 being the lowest. The Access Point can determine the average signal strength 404 by various algorithms as previously described. The policy for forcing a roam could be that a client should roam when ever the average signal strength drops below some threshold value for example 4 or if the min signal strength 406 drops below a some threshold value for example 5. This is an alternate method to force the client into a roaming mode.

In another embodiment, the minimum 406 must be within a certain percentage of the max signal strength 408 or must be within average signal strength 404.

In another embodiment, the determination could be based on time and percentage time that signal strength is not at acceptable ranges. Or a combination of values and times could be used.

If a pattern is detected where the parameters between several clients is similar, then noise is assumed as the problem and actions are taken.

Figure 7:
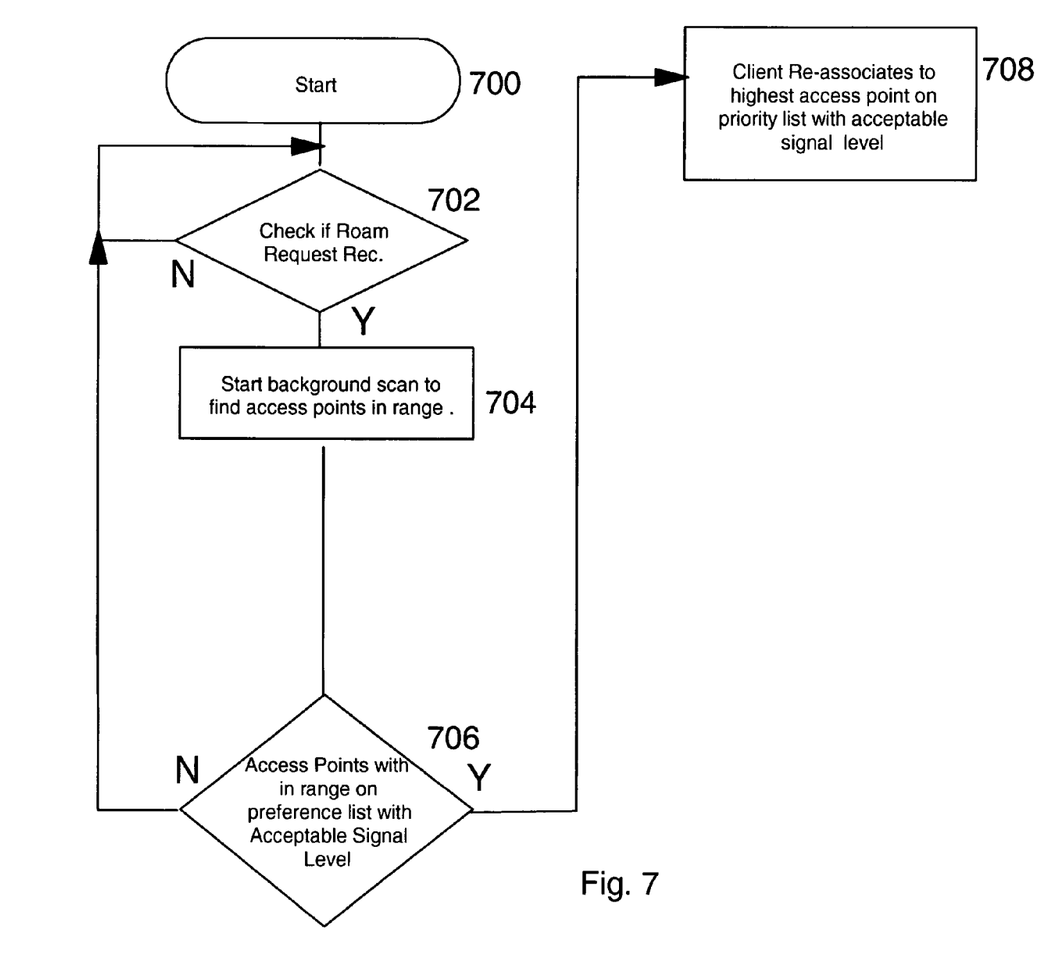
FIG. 7 shows a flow diagram of a method to re-associate with access point with lower noise to improve performance.

FIG. 7 flow is executed on the client device. The flow starts at 700 and descends into 702, the client in a background loop checks if Roam request has been received from access point. In the absence of a request, flow returns to 702. If a request has been received, flow moves to 704, where it starts a background scan to find access points within range and associated signal quality. In step 706, the client determines if there is an access point within range that is on the preference list with acceptable signal level. If there are no other access points in range, then roam request is ignored and flow returns to 702. If an acceptable access point is in range, then flow is transferred to 708, there the client re-associates to a new access point. The client selects the access point that is highest on preference list with acceptable signal quality. The client may use any of techniques, set forth herein, used by the Access Point to assess signal quality.

The access point checks the signal strength of each client when receiving signals from that client. The client is transmitting data to the access point and based on the magnitude of the incoming signal, the access point determines the signal strength from the client. The values for signal strength are normalized when stored in the table 236.

In table 236, the normalized values for the signal strength are stored with 10 being the highest and 1 being the lowest. If the AP for a client has a min/max values in one case of 4 and 6 and another case of 3 and 5 respectively, that would be a spread of 2 deltas between min and max. If for another client it recorded values of 3 and 8, being a spread of 5 would indicate a large spread and likely impacted by interference.

The client could implement a similar scheme where it tracks signal strength from the access point to the client. The collected data would be similar to a single row in table 236, since the client is only associated to a single access point unlike the access points that have multiple clients. The normalized values for the signal strength are stored with 10 being the highest and 1 being the lowest. If the client the AP has a min/max values in one case of 3 and 5 resulting in an average of 4, which is below the threshold for roaming of 4 or if the min signal strength dropped to 2, which is below the minimum threshold value, the client would start roaming for another access point.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method comprising:
    determining an interference noise level for a connection between a client and an access point at the access point, wherein the interference noise level is determined based on a spread between a minimum signal strength and a maximum signal strength of the connection; and
    invoking the client to switch to another access point in response to an occurrence selected from the group consisting of the interference noise level exceeding a first threshold, and the minimum signal strength falling below a predefined percentage of the maximum signal strength.

2. The method of claim 1 further including;
    providing a table within the access point in which the minimum and the maximum signal strengths are stored; and
    dynamically updating the minimum and the maximum signal strength in the table via a computer executable program executed by the access point.

3. The method of claim 2 further including:
    executing the computer executable program to calculate an average signal strength;
    storing the average signal strength in the table; and
    invoking the client from the access point to switch to another access point in response to the average interference noise level exceeding a second threshold.

4. The method of claim 1 further including setting a roam request flag, which is periodically polled by the client, at the access point as the interference noise level exceeds the first threshold.

5. The method of claim 1 further including:
    computing, at the access point, an average of the minimum and the maximum signal strength; and
    invoking, from the access point, the client to switch to another access point as the average exceeds a second threshold.

6. The method of claim 1 further including invoking the client from the access point to switch to another access point as the minimum signal strength falls below a second threshold.

7. The method of claim 1 further including invoking the client from the access point to switch to another access point based on the amount of time the interference noise level exceeds the threshold.

8. A system comprising:
    an access point including a controller coupled to a wireless interface adapter and a wired interface adapter, said controller including a memory with a table for storing parameters indicative of an interference noise level for a connection between a client and said access point; and a processor executing a program that accesses the table and uses recorded information to:

determine an interference noise level for the connection based on a spread between a minimum signal strength and a maximum signal strength of the connection; and invoke the client to switch to another access point in response to an occurrence selected from the group consisting of the interference noise level exceeding a first threshold, and the minimum signal strength falling below a predefined percentage of the maximum signal strength.

9. The system of claim 8, wherein the processor executing the program is further configured to cause the client to:
set a roam request flag; and
cause the client to periodically poll the roam request flag in response to the interference noise level exceeding the first threshold.

10. The system of claim 8, wherein the processor executing the program is further configured to cause the client to:
compute an average of the minimum and the maximum signal strength; and
invoke the client to switch to another access point in response to the average exceeding a second threshold.

11. The system of claim 8, wherein the processor executing the program is further configured to invoke the client to switch to another access point in response to the minimum signal strength falling below a second threshold.

12. The system of claim 8, wherein the processor executing the program is further configured to invoke the client to switch to another access point based on the amount of time the interference noise level exceeds the threshold.

13. A method, comprising:
providing a computer storage medium having executable program code stored therein, the program code in said product being effective to, when executed on a computer, cause the computer to:

determine an interference noise level for a connection between a client and an access point at the access point, wherein the interference noise level is determined based on a spread between a minimum signal strength and a maximum signal strength of the connection; and cause the access point to invoke the client to switch to another access point in response to the occurrence selected from the group consisting of the interference noise level exceeding a first threshold and the minimum signal strength falling below a predefined percentage of the maximum signal strength.

14. The method of claim 13, wherein the program code is further effective to, when executed on the computer, cause the computer to:
set a roam request flag; and
invoke the client to periodically poll the roam request flag upon the occurrence of the interference noise level exceeding the first threshold.

15. The method of claim 13, wherein the program code is further effective to, when executed on the computer, cause the computer to:
compute an average of the minimum and the maximum signal strength; and
invoke the client to switch to another access point upon the occurrence of the average exceeding a second threshold.

16. The method of claim 13, wherein the program code is further effective to, when executed on the computer, cause the computer to invoke the client to switch to another access point upon the occurrence of the minimum signal strength falling below a second threshold.

17. The method of claim 13, wherein the program code is further effective to, when executed on the computer, cause the computer to invoke the client to switch to another access point based on the amount of time the interference noise level exceeds the threshold.

* * * * *